(12) United States Patent
Dhodapkar

(10) Patent No.: US 10,104,214 B2
(45) Date of Patent: Oct. 16, 2018

(54) SEAMLESS IN-CALL VOICE NOTES

(75) Inventor: Chinmay S. Dhodapkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 13/470,225

(22) Filed: May 11, 2012

(65) Prior Publication Data
US 2013/0303130 A1 Nov. 14, 2013

(51) Int. Cl.
*H04M 1/656* (2006.01)
*H04M 3/42* (2006.01)

(52) U.S. Cl.
CPC ....... *H04M 1/656* (2013.01); *H04M 3/42221* (2013.01); *H04M 2250/68* (2013.01); *H04M 2250/74* (2013.01)

(58) Field of Classification Search
CPC ......... H04M 3/42221; H04M 3/42204; H04M 3/4931; H04M 3/4936; H04M 3/4938; H04M 2203/258; H04M 2203/30; H04M 2203/357; H04M 1/656; H04M 2250/68; H04M 2250/74; H04L 65/607; H04L 65/608; H04L 1/004; H04L 1/0041; H04L 1/0078; H04L 1/0079; H04L 1/0084; H04L 65/1073; H04L 65/4061; H04L 12/1831
See application file for complete search history.

(56) References Cited

U.S. PATENT DOCUMENTS

| | | | |
|---|---|---|---|
| 5,870,454 A | 2/1999 | Dahlen | |
| 6,222,909 B1 * | 4/2001 | Qua et al. | 379/88.22 |
| 6,661,879 B1 | 12/2003 | Schwartz et al. | |
| 7,980,465 B2 | 7/2011 | Kirkland et al. | |
| 8,611,509 B1 * | 12/2013 | Basart et al. | 379/88.17 |
| 2002/0118798 A1 | 8/2002 | Langhart et al. | |
| 2003/0045329 A1 | 3/2003 | Kinoshita | |
| 2003/0145077 A1 * | 7/2003 | Khan | H04L 29/06027 709/224 |

(Continued)

FOREIGN PATENT DOCUMENTS

| | | |
|---|---|---|
| CN | 1825865 A | 8/2006 |
| CN | 102413240 A | 4/2012 |

(Continued)

OTHER PUBLICATIONS

International Search Report and Written Opinion—PCT/US2013/039418—ISA/EPO—dated Aug. 21, 2013.

*Primary Examiner* — George Eng
*Assistant Examiner* — Hung Du
(74) *Attorney, Agent, or Firm* — Jae-Hee Choi; The Marbury Law Group

(57) ABSTRACT

The disclosure relates to seamlessly generating an in-call voice note. An embodiment of the disclosure conducts a call with a target wireless subscriber device, transmits, to the target wireless subscriber device, an indication to start recording a portion of the call, and transmits, to the target wireless subscriber device, an indication to stop recording the portion of the call. Another embodiment of the disclosure conducts a call with an originator wireless subscriber device, receives, from the originator wireless subscriber device, an indication to start recording a portion of the call, and receives, from the originator wireless subscriber device, an indication to stop recording the portion of the call.

38 Claims, 7 Drawing Sheets

(56) References Cited

U.S. PATENT DOCUMENTS

| | | | |
|---|---|---|---|
| 2006/0123316 A1* | 6/2006 | Youm | 714/758 |
| 2006/0213969 A1* | 9/2006 | Russell et al. | 235/375 |
| 2008/0221883 A1* | 9/2008 | Kirkland et al. | 704/235 |
| 2009/0006089 A1 | 1/2009 | Shenassa et al. | |
| 2009/0028310 A1 | 1/2009 | Anderson | |
| 2009/0326803 A1* | 12/2009 | Neef et al. | 701/201 |
| 2010/0323669 A1* | 12/2010 | Maggenti | H04M 3/42221 |
| | | | 455/413 |
| 2011/0019971 A1* | 1/2011 | Yamane | H04N 5/44543 |
| | | | 386/252 |
| 2011/0078316 A1* | 3/2011 | Tuohino et al. | 709/227 |
| 2011/0098917 A1* | 4/2011 | LeBeau et al. | 701/201 |
| 2011/0099006 A1* | 4/2011 | Sundararaman | G10L 15/26 |
| | | | 704/208 |
| 2011/0173705 A1 | 7/2011 | Sundaram et al. | |
| 2011/0216896 A1* | 9/2011 | Martin et al. | 379/265.06 |
| 2011/0287748 A1 | 11/2011 | Angel et al. | |

FOREIGN PATENT DOCUMENTS

| | | |
|---|---|---|
| JP | 2001251440 A | 9/2001 |
| JP | 2005234666 A | 9/2005 |
| JP | 2007110186 A | 4/2007 |
| WO | 2008061482 A1 | 5/2008 |
| WO | 2010148349 A1 | 12/2010 |

\* cited by examiner

SEAMLESS IN-CALL VOICE NOTES

FIELD OF DISCLOSURE

The disclosure relates to wireless communications between mobile devices, and more particularly to seamlessly recording in-call voice notes.

BACKGROUND

Frequently during a call, such as an audio and/or video call, one person may convey some critical information to the other person that needs to be written down by the recipient, typically using a pen and paper. Even when the recipient of the information has a Smartphone, he or she must still open a notepad application and type in the information. Often during this fumbling, the information has to be repeated and the continuity of the conversation is disrupted.

SUMMARY

The disclosure relates to seamlessly generating an in-call voice note. An embodiment of the disclosure conducts a call with a target wireless subscriber device, transmits, to the target wireless subscriber device, an indication to start recording a portion of the call, and transmits, to the target wireless subscriber device, an indication to stop recording the portion of the call. An embodiment of the disclosure conducts a call with an originator wireless subscriber device, receives, from the originator wireless subscriber device, an indication to start recording a portion of the call, and receives, from the originator wireless subscriber device, an indication to stop recording the portion of the call.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
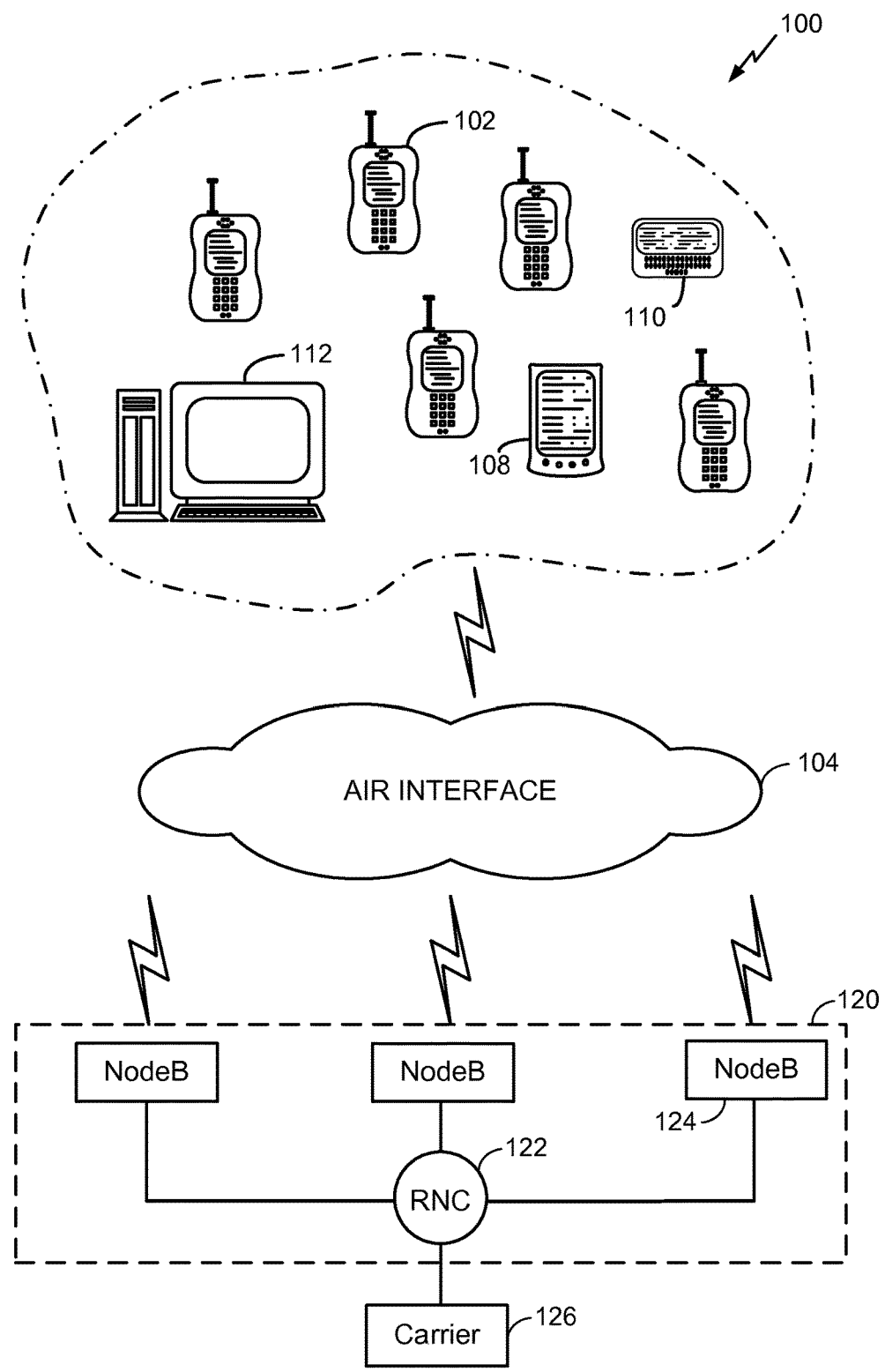
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the UE 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of UE including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal," "AT," "wireless device," "client device," "mobile terminal," "mobile station," and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2:
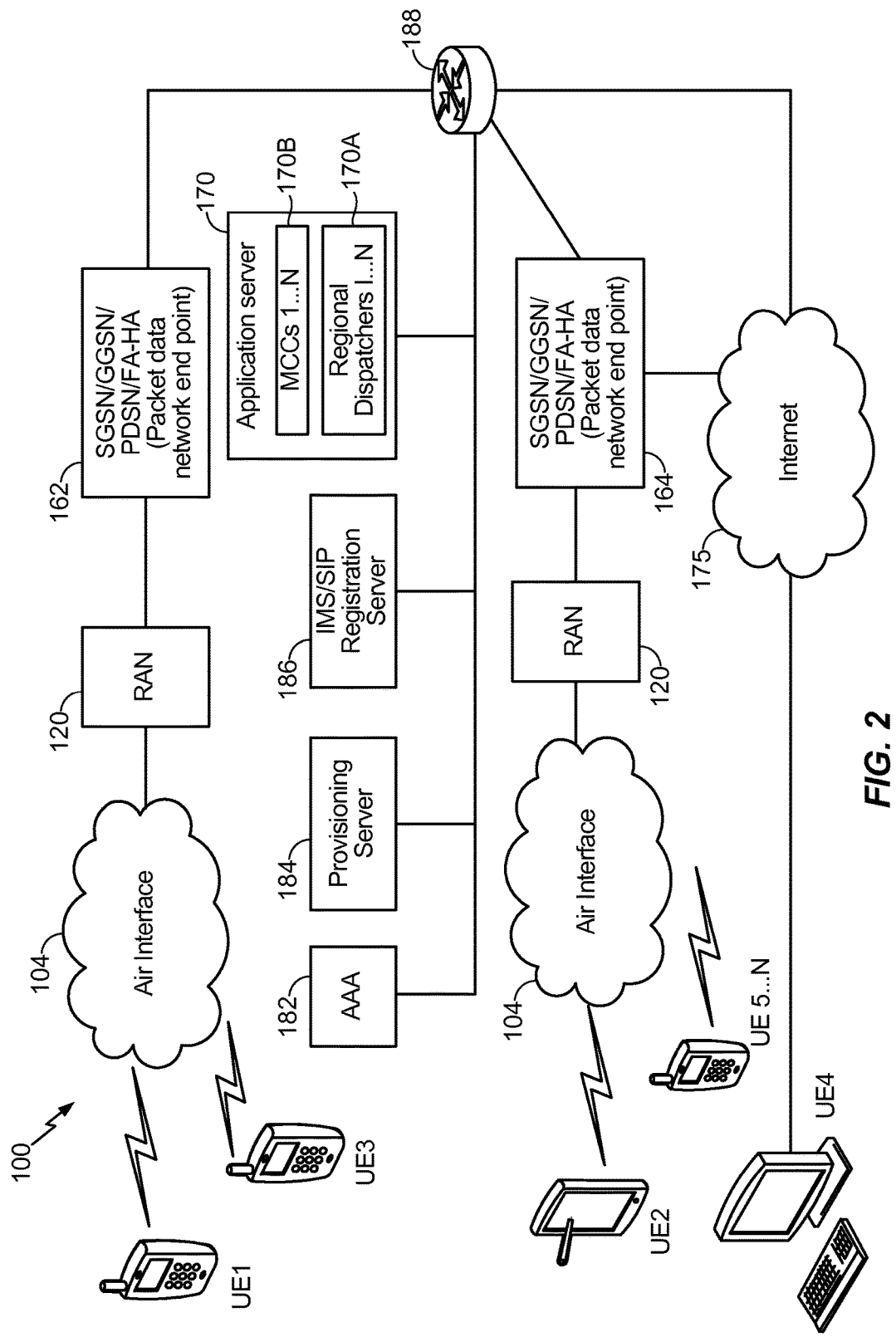
FIG. 2 illustrates an example of the wireless communications system of FIG. 1 in more detail.

FIG. 2 illustrates an example of the wireless communications system 100 of FIG. 1 in more detail. In particular, referring to FIG. 2, UEs 1 . . . N are shown as connecting to the RAN 120 at locations serviced by different packet data network end-points. The illustration of FIG. 2 is specific to W-CDMA systems and terminology, although it will be appreciated how FIG. 2 could be modified to conform with various other wireless communications protocols (e.g., LTE, EV-DO, UMTS, etc.) and the various embodiments are not limited to the illustrated system or elements.

UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2, UEs 1, 3 and 4 . . . N are illustrated as wireless cell-phones, UE 2 is illustrated as a wireless tablet- and/or laptop PC. However, in other embodiments, it will be appreciated that the wireless communication system 100 can connect to any type of UE, and the examples illustrated in FIG. 2 are not intended to limit the types of UEs that may be implemented within the system.

Figure 3:
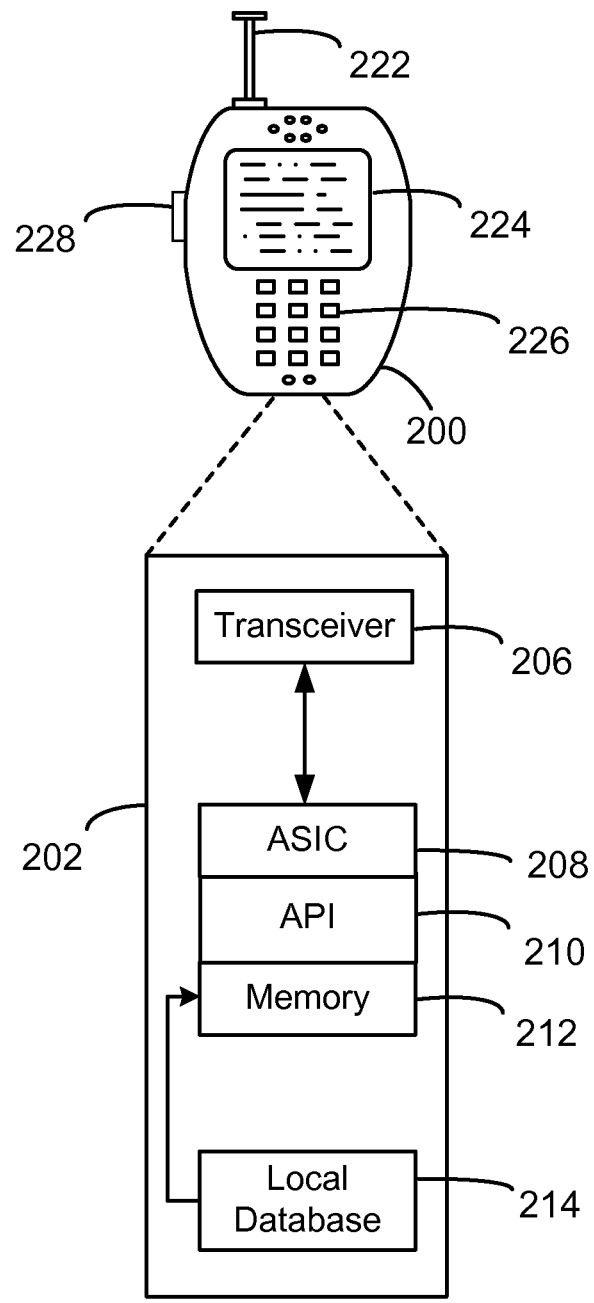
FIG. 3 illustrates a user equipment (UE) in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), 3GPP Long Term Evolution (LTE) or other protocols that may be used in a wireless communications network or a data communications network. Accordingly, the illustrations provided herein are not intended to limit the embodiments of the invention and are merely to aid in the description of aspects of embodiments of the invention.

Figure 4:
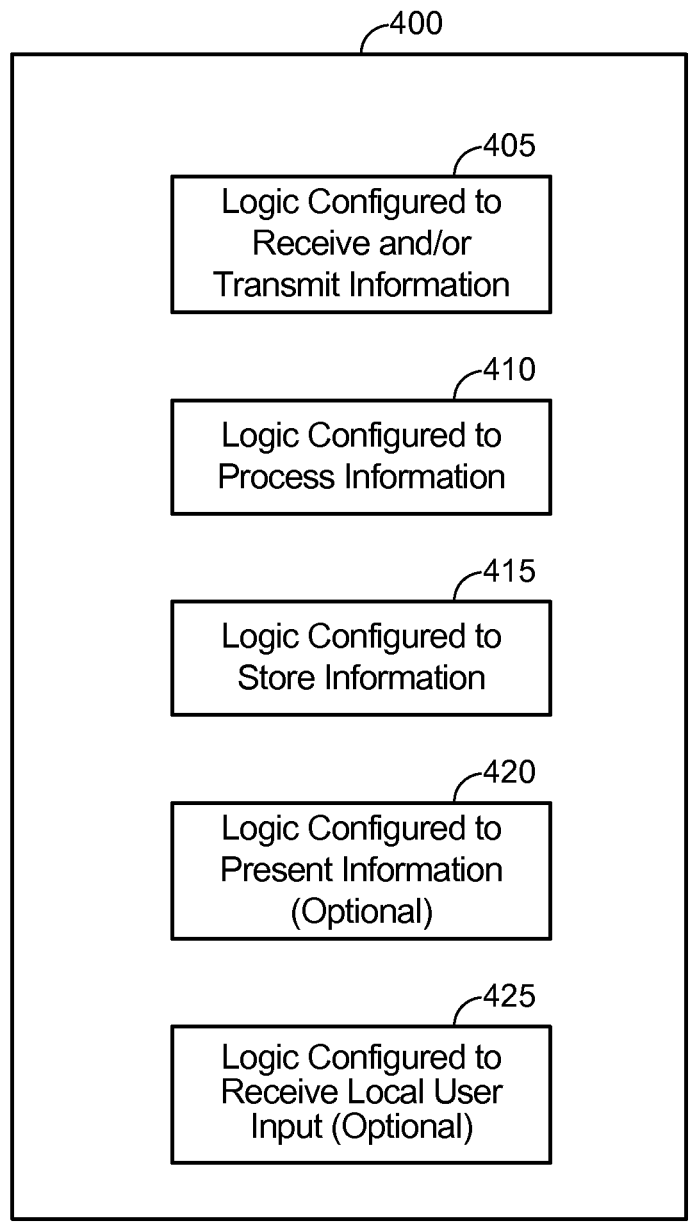
FIG. 4 illustrates a communication device that includes logic configured to perform functionality.

FIG. 4 illustrates a communication device 400 that includes logic configured to perform functionality. The communication device 400 can correspond to any of the above-noted communication devices, including but not limited to UEs 102, 108, 110, 112 or 200, Node Bs or base stations 120, the RNC or base station controller 122, a packet data network end-point (e.g., SGSN 160, GGSN 165, a Mobility Management Entity (MME) in Long Term Evolution (LTE), etc.), any of the servers 170 through 186, etc. Thus, communication device 400 can correspond to any electronic device that is configured to communicate with (or facilitate communication with) one or more other entities over a network.

Referring to FIG. 4, the communication device 400 includes logic configured to receive and/or transmit information 405. In an example, if the communication device 400 corresponds to a wireless communications device (e.g., UE 200, Node B 124, etc.), the logic configured to receive and/or transmit information 405 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., SGSN 160, GGSN 165, application server 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to display information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 200 as shown in FIG. 3, the logic configured to present information 420 can include the display 224. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 200 as shown in FIG. 3, the logic configured to receive local user input 425 can include the display 224 (if implemented a touch-screen), keypad 226, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 405. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410. Finally, embodiments include logic configured to calibrate and correct sensor data 501, as will be described in more detail below.

It will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Frequently during a call, such as an audio and/or video call, one person may convey some critical information to the other person that needs to be written down by the recipient, typically using a pen and paper. Even when the recipient of the information has a Smartphone, he or she must still open a notepad application and type in the information. Often during this fumbling, the information has to be repeated and the continuity of the conversation is disrupted.

Embodiments of the invention are directed to permitting call participants to seamlessly take in-call notes. In an embodiment of the invention, an originator device (i.e. the source of the information to be recorded, and not necessarily the call originator) embeds signals into a portion of the data stream that instruct the target device (i.e. the recipient of the information to be recorded) to record that portion of the data stream. The target may continue to output the stream during the recording, for example, through a speaker and/or display screen. The resulting recorded portion of the real-time data stream on the target device is referred to as a "voice note." Note that although it is called a "voice note," the recording may include audio, video, and/or opaque data. Also, while the term "voice" normally connotes audio information and perhaps even human-specific audio information, no such connotation is intended unless expressly indicated. Accordingly, a voice note could be implemented as a video-only recording, a recording of a stream of GPS coordinates and/or a recording of any other type of information that is sent by the originator device to the target device during the call.

Any participant in a call may at some point be an originator or a target of media being exchanged therein. In a two participant call, for example, the first participant may be the originator for one voice note, while the second participant may be the originator for another voice note. In a group call, one participant may indicate to one, more than one, or all other participants to record a subsequent voice note, as described below. In this disclosure, the terms "originator" and "target" may refer to the originating device or subscriber and target device or subscriber, respectively, unless one or the other is specifically indicated. Again, unless indicated otherwise, the status of a device as an originator or target is with respect to specific media being exchanged during the call, and does not necessarily imply which device originated the call itself and/or which device was called at call set-up.

Figure 5:
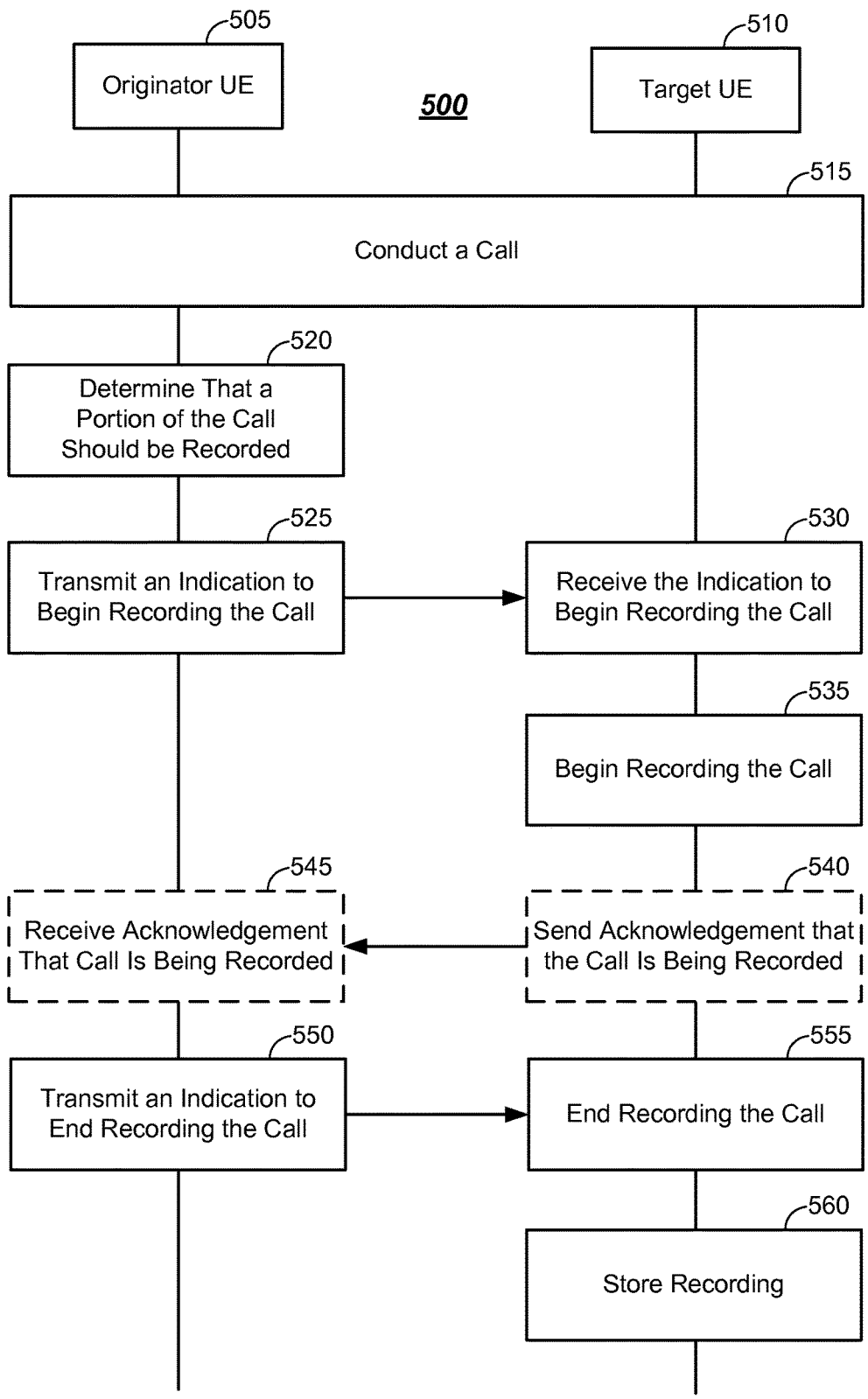
FIG. 5 illustrates an exemplary flowchart according to at least one embodiment of the invention.

FIG. 5 illustrates an exemplary flowchart 500 of an embodiment of the invention. At 515, an originator UE 505 and a target UE 510, such as UEs 102, 108, 110, and 200, are engaged in a call with each other. At 520, originator UE 505 determines that a subsequent portion of the call should be recorded as a voice note. At 525, the originator UE 505 transmits an indication to the target UE 510 to begin recording the call (i.e. the voice note). At 530, the target UE 510 receives the indication to begin recording and at 535 begins recording the call. At 540, the target UE 510 sends an acknowledgement to the originator UE indicating that the call is being recorded. At 545, the originator UE 505 receives the acknowledgement. Aspects 540 and 545 are illustrated with a dashed line because they are optional features, as is discussed below. At 550, the originator UE 505 transmits an indication to target UE 510 to stop recording the call, and at 555, the target UE 510 stops recording the call. At 560, the target UE 510 stores the recorded portion of the call. This recording is the voice note. Various aspects of FIG. 5 are described in more detail below.

Referring to 525 and 550 of FIG. 5, in order to signal which portion of the data stream should be recorded at the target UE 510, in an embodiment, the originator UE 505 may insert a beginning marker into the first data packet of the data stream to be recorded at 525 and an ending marker into the last data packet to be recorded at 550. In an example, all data packets between and including the beginning and ending data packets would be recorded at 535-555. In another embodiment, the originator UE 505 may insert a marker into each data packet of the data stream to be recorded at the target UE 510. This is beneficial where a "stop recording" marker may be lost, such as in a wireless environment. Thus, in the scenario where each data packet to be recorded includes a recording marker, the indication to end recording of the call at 550 may be implemented by originating UE 505 ceasing to include the recording marker in the data packets of the call. With the addition of the marker in each data packet, the target UE 510 will record at 535-555 only the packets that have been marked for recording. The marker may be added to the header or the payload of the data packet.

The originator UE 505 may require permission from the target UE 510 to make a recording because, for example, the recording will take up storage space on the target UE 510. A subscriber operating a voice note-enabled mobile device such as the target UE 510 may set one or more preferences regarding the recording of voice notes, such as who has permission to record voice notes on the mobile device, for example, certain groups of contacts, all contacts, everyone, etc. The subscriber may also set preferences regarding the length, quality, and/or file size, the total amount of storage space allotted, whether to record audio and video when available, or just audio or video, etc. The subscriber may also set the level of notification required to record a voice note. For example, the subscriber may allow other devices to record voice notes on the mobile device automatically, after notifying the subscriber that the originator UE 505 wants the target UE 510 to record a voice note, only after asking the subscriber for permission to record a voice note (which would require a positive response from the subscriber), etc. The subscriber may also set different levels of notification for different groups. For example, the subscriber may permit anyone in a family member group to record voice notes without prompting, while requiring everyone else to ask for permission. The originator 505 may notify the subscriber and/or ask for permission by, for example, causing a message to appear on the screen of the target UE 510 that notifies the subscriber of the originator's intent to record a voice note on the target UE 510 and/or asking if the target UE 510 is willing to record a voice note from the originator UE 505. The subscriber may also set preferences permitting him or her to stop the recording of a voice note before the originator UE 505 signals that recording should stop.

The subscriber may also set preferences regarding the post-processing of recorded voice notes stored on the target UE 510. For example, the subscriber may wish to be notified immediately after a new voice note is recorded, or may simply wish to be notified of all new voice notes at the end of the call. The subscriber may set preferences indicating that all voice notes should be stored as-received, i.e. as audio, video, and/or data, or that all voice notes should be converted to text. The subscriber may also set preferences regarding how to post-process certain types of voice notes. For example, the subscriber may indicate that all name and phone number combinations be automatically stored in the subscriber's contact list. In another example, the subscriber may indicate that all addresses be located in a mapping application and/or entered into a navigational application. As is apparent, there are numerous possibilities for how the target UE 510 may post-process voice notes, and embodiments of the invention are not limited to any particular one.

Where embodiments of the invention are realized in an application (e.g. an "app") that can be installed on a mobile device (e.g., target UE 510 in FIG. 5), the subscriber may set the preferences described above through the application's interface, such as one of the APIs 210 from FIG. 3. The subscriber will not necessarily need to manipulate the application during a call to enforce the voice note recording. Rather, so long as the application is running in the background, the target UE 510 can be configured to record voice notes as instructed by the originator UE 505 and/or based upon the subscriber's preferences. Where software logic configured to execute embodiments of the invention is integrated into the mobile device's operating system, the subscriber may set the preferences described above through the mobile device's menu or settings interface. When the target UE 510 receives a signal to record a voice note, the target UE 510 will automatically recognize it as such and respond accordingly, without the need for an application to be running in the background.

Referring back to 520 of FIG. 5, the originator device may determine at 520 that a portion of the call should be recorded in a number of ways. For example, the originator subscriber may signal the originator UE 505 to begin and end embedding voice note recording signals in the data stream by pushing a "start recording" button and an "end recording" button, respectively. Alternatively, the originator subscriber may use voice commands, such as "begin recording" and "end recording." The voice commands can facilitate the voice note's recording based on the originator UE 505 interpreting the voice commands and then setting the appropriate recorder markers at 525 and 550, or alternatively the voice commands can simply be conveyed to the target UE during the call and the target UE 510 itself can interpret the voice commands as the indications to start and stop recording the voice note at 530 and 555. Thereby, the voice commands may be predefined and recognized using voice recognition software at either the originator UE 505 or the target UE 510. In another example, the originator UE 505 may detect the originator subscriber changing his or her intonation in such a way that it indicates the words being or about to be spoken should be recorded. For example, the originator subscriber may speak more loudly when he or she wants his or her words to be recorded as a voice note by the target UE 510. This may be determined by monitoring the volume of the originator subscriber's voice, and if the originator subscriber's voice volume increases above a threshold, the originator UE 505 is signaled that the data stream should be recorded. When the volume of the originator subscriber's voice then falls below a threshold, it would signal that the data stream should no longer be recorded.

In an embodiment of 520 of FIG. 5, the originator UE 505 may direct the target UE 510 to pause the recording of a voice note at the target UE 510 and then resume the voice note after a pause period. The originator UE 505 may alternatively direct the target UE 510 to stop the recording of the voice note instead of resuming it. The originator UE 505 may also direct the target UE 510 to pause one voice note, and while it is paused, have the target UE 510 record another voice note (e.g., such that a new voice note is not necessarily a continuation of a previous voice note). The originator UE 510 may also direct the target UE 510 to pause the second voice note, finish recording the first voice note, then resume the second voice note. As is apparent, any number of scenarios is possible. The originator subscriber may control the start, stop, pause, and resume functions using simple voice commands or button selections at the originator UE 505. For example, the originator subscriber could say or press "begin recording," "pause recording," "resume recording," and/or "end recording," or some other variant.

In another embodiment, at 520 of FIG. 5, the originator device may detect a context of the call or of the originator device that indicates that the subsequent data stream should be recorded. For example, the originator subscriber saying certain trigger words or phrases (possibly predetermined or predefined in the preferences), such as "address," "phone number," "name," "remember this," "this is important," etc., may signal that the subsequent data stream should be recorded. These trigger words or phrases may be detected by voice recognition software, or the data stream may be converted to text in real time.

In another embodiment of 520 of FIG. 5, the originator device may detect that the originator subscriber, while on a call, is launching a navigational application, and will therefore be entering a destination, either audibly or by typing. The originator device may automatically instruct the target device to record the subscriber speaking the destination, or the originator device may transmit the originator subscriber's keypad entries and instruct the target device to record the corresponding data stream. As is apparent, there are many ways in which a subscriber may trigger the recording of a voice note in 520, and embodiments of the invention are not limited to any particular one.

In another embodiment of 520 of FIG. 5, the originator device, instead of detecting keywords in real time that may trigger the recording of a subsequent voice note at the target UE 510, may in 520 buffer a certain amount of the data stream as it is generated and analyze it for certain constructs, such as a name, address, phone number, driving directions, Internet address, list of items, etc. The target device would also be configured to buffer the same amount of the data stream as it is received. When the originator UE 505 recognizes one of the constructs, or a possible beginning of one of the constructs, it may instruct the target UE 510 to record or begin recording the corresponding portion of the data stream at 525. The originator device may use a speech-to-text analyzer, for example, to analyze the buffered data stream for such constructs. Further, only a few seconds of the data stream would need to be buffered, as it generally does not take very long to say, for example, an address, a phone number, or to recognize the beginning of a list of directions.

In another embodiment of 520 of FIG. 5, the originator device may display a confirmation dialog to the originator subscriber when it detects that the data stream should be recorded based on the subscriber's preferences. For example, if the originator subscriber has set a preference to facilitate the target UE 510 to record a voice note when the originator subscriber says "address," the originator device, upon detecting the word "address" during a call, may ask the originator subscriber to confirm whether the originator subscriber actually wants the target UE 510 to record the data stream. This may be done where the originator device buffers a portion of the data stream, or when the originator device detects that the originator subscriber has spoken a trigger phrase. No confirmation would be necessary when the originator subscriber actively triggers the recording, such as when the subscriber pushes a "start recording" button or says "begin recording." However, as is apparent, the originator subscriber could set a preference that the start of a recording should always be confirmed, or that it should be confirmed if there is any ambiguity. The notification itself may be a simple beep to get the originator subscriber's attention along with a message displayed on the screen asking for confirmation. Alternatively, these operations could be done through voice prompts.

In a group call, the originating subscriber may also select which participants should record a subsequent voice note at 520. The originator subscriber may select participants by selecting their names through the originator device's user interface, or by saying them aloud in combination with some other keyword(s). For example, the originator may say, "Record voice note for Jennifer, Jeff, Chris, Susan, and Steve." To stop, however, there would be no need to say the participants' names again. A phrase such as "stop recording" or pressing a "stop" button would be sufficient.

In some cases, the originator subscriber's preferences may not instruct the target device to record a portion of the data stream that the target subscriber would like to have recorded, or the originator subscriber may not have pushed the record button, not realizing that the target subscriber would like a voice note of the information. In that case, the target subscriber may simply ask the originator subscriber to signal his or her mobile device to have the subsequent data stream recorded and to then repeat the information. Alternatively, the originator subscriber may have set a preference whereby the data stream between the phrases, "could you please repeat that" and "thank you," or some such variation, would automatically be recorded at the target device.

The target device may notify the target subscriber when a new voice note is recorded on the target device. The target device may store the voice note at 560 as an audio, video, or data file for later retrieval. The target device may store voice notes in any number of ways. For example, the target device may store each voice note in a discrete file, or store each voice note recorded during a given call in a single file, or store each voice note created in a 24-hour period in a single file, etc.

The target device may process a recorded voice note in a number of ways, even while the target subscriber is still on the call. The target device may ask the target subscriber how he or she would like to post-process the voice note, or else perform the post-processing automatically. For example, the target device may immediately convert an audio stream to text, using voice-to-text software. The target device may then analyze the text to identify information such as names, addresses, phone numbers, points of interest, driving directions, Internet addresses, etc. If the target device identifies a name and phone number, for example, it may add that name and number to the target subscriber's contact list. If the target device identifies an address, on the other hand, it may fetch map data about the address and/or start a navigational application in the background and load the address into it. If the target device identifies an Internet address, it may open an Internet browser application and navigate to that website. Performing these functions while the target subscriber is on a call saves the subscriber the time required to do them after the call.

In some cases, the originator device may have the capability to record voice notes while the target UE 510 may not. The originator UE 505 need not know this in advance. If the originator UE 505 embeds the signal to record a voice note in the data stream at 525 and the target does not have the capability to record it (e.g. because the allotted storage space is full or the target device simply does not have the necessary functionality), the embedded signal will be ignored. In an embodiment, the target device may return an acknowledgement to the originator device at 540 indicating that the target is recording the data stream. If the originator device does not receive this acknowledgement at 545 within a certain amount of time, the originator device may assume that the target device is not capable of recording the voice note and stop signaling the target device to do so. Alternatively, where the target device has the functionality to record the voice note but cannot do so for some reason, for instance a lack of storage space, the target device may send a negative acknowledgment to the originator (as at 625 described below). The originator device may also notify one or both subscribers that recording the voice note failed. For example, the originator UE 505 may send a short message service (SMS) message (e.g. a "text" message) to the target device and/or display a notification on the originator device's screen or play an error sound.

Figure 6A:
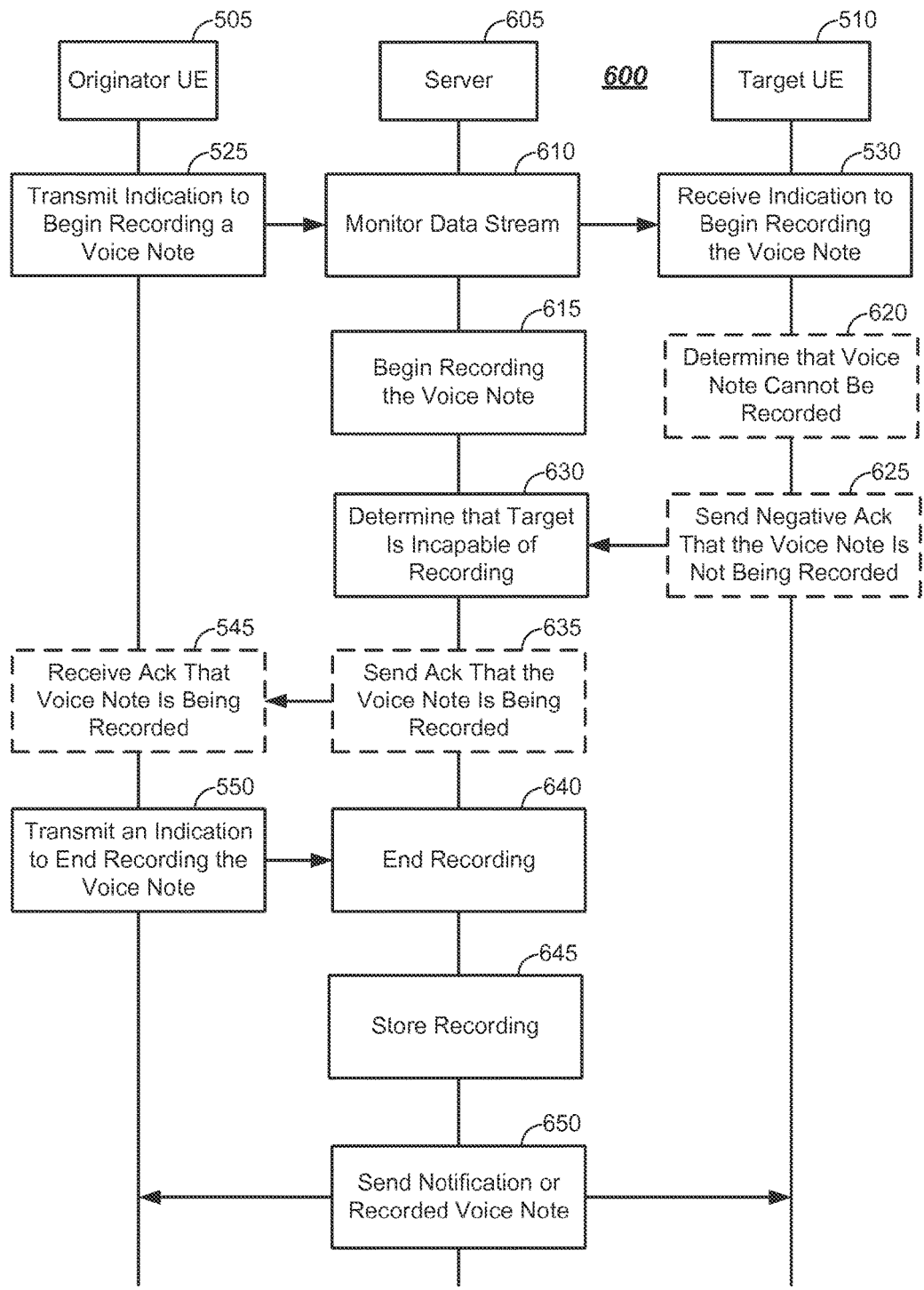
FIG. 6A and FIG. 6B illustrate exemplary flowcharts according one or more embodiments of the invention.

FIG. 6A illustrates an exemplary flowchart 600 of an embodiment of the invention whereby a server records the voice note instead of the target UE 510. Certain operations of FIG. 6A are the same as described with reference to FIG. 5, and are therefore marked with the same reference numbers. Accordingly, in FIG. 6A, assume that originator UE 505 and target UE 510 are engaged in a call brokered by server 605. At 525, the originator UE 505 transmits an indication to begin recording a voice note, as discussed above. At 610, server 605 monitors the data stream, and at 615, begins recording the voice note. At 530, the target UE 510 receives the indication to begin recording the voice note. At 620, the target UE 510 may determine that it cannot record the voice note because, for example, it does not have the storage space or the subscriber's preferences will not permit it to do so. At 625, the target UE 510 sends a negative acknowledgement, informing the originator UE 505 that it cannot record the voice note.

Aspects 620 and 625 are illustrated with a dashed line because they are optional aspects. The target UE 510 may not have the capability to detect the received indication, and therefore may not be able to determine that the voice note cannot be recorded. In that case, the indication embedded in the data stream will be ignored and aspects 620 and 625 will not be performed. Alternatively, the target UE 510 may determine that the voice note cannot be recorded in 620, but not send a negative acknowledgement in 625.

Figure 6B:
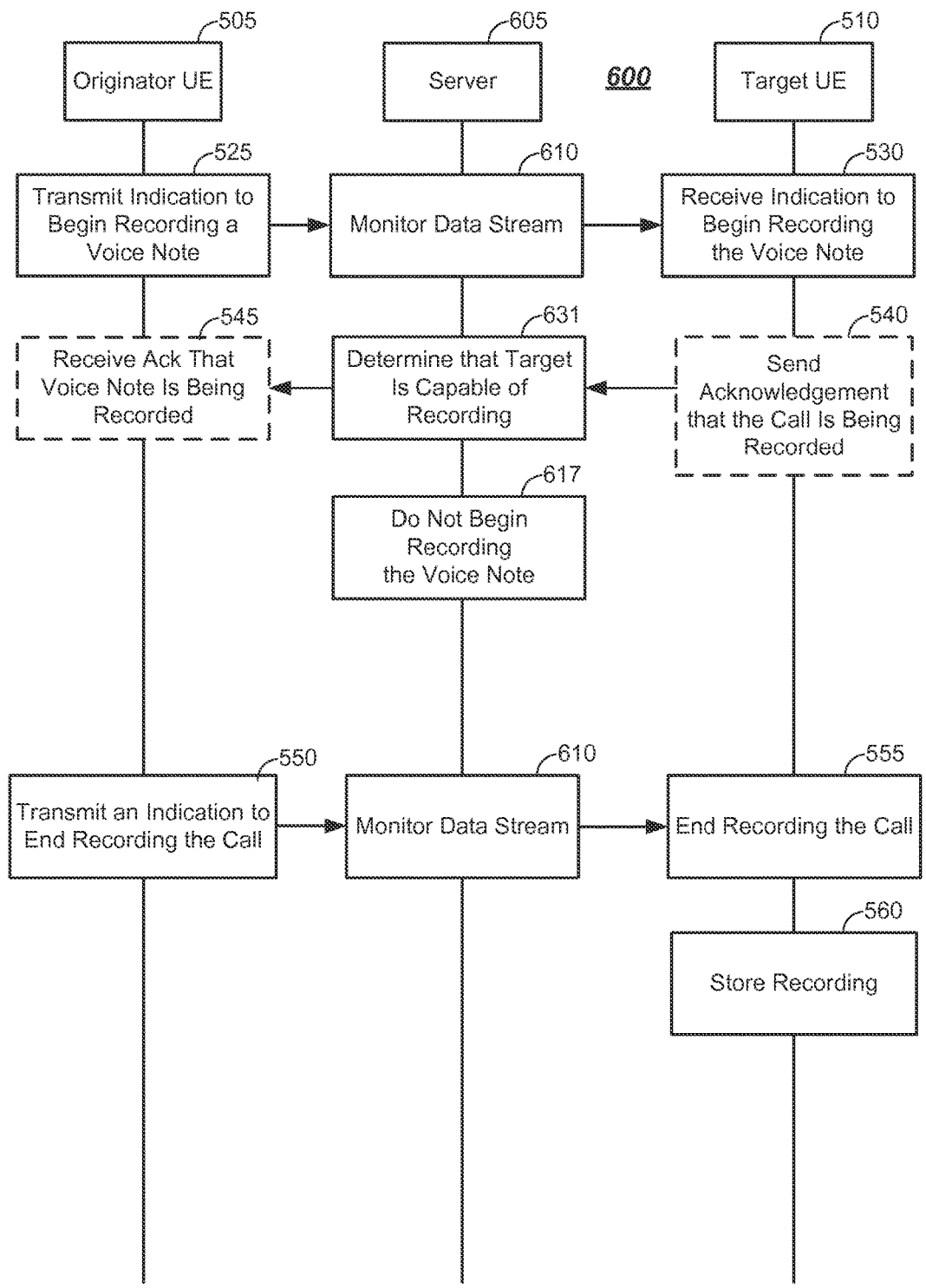

At 630, the server 605 determines that the target UE 510 is incapable of recording the voice note, either by intercepting the negative acknowledgment or determining that the target UE has not replied with a positive acknowledgment within a threshold period of time. At 635, the server 605 may send an acknowledgment to originator UE 505 instead and discard any negative acknowledgment from target UE 510. That way, the originator UE 505 will not stop marking packets to be recorded, but will continue transmitting as it otherwise would. The acknowledgement may, but need not, indicate that the server 605 is recording the voice note. The acknowledgment from the server 605 may be the same as an acknowledgement that would be received from the target UE 510. Aspects 545 and 635 are illustrated with a dashed line because, as described above, it is not necessary to send any acknowledgements. More particularly, in an embodiment, as illustrated in FIG. 6B, an indication may be received by the server 605 from the target UE 510 that it is capable of recording the portion of the call, such as an acknowledgement 540 of the indication from originator UE 505 to begin recording. The server 605 may thereby determine that the target UE 510 is capable of recording the call. In response to receiving the indication, the server 605 may not record the portion of the call at 617. Alternatively, or additionally, as described above, an indication may be received by the server 605, such as a negative acknowledgement, from the target UE 510 that it is not capable of recording the portion of the call. In response to receiving the indication, the server 605 may record the portion of the call as previously described.

When the originator UE 505 has marked the end of the voice note at 550, the server will end recording at 640, store the recording at 645, and, at 650, send a message to the target UE 510 informing it of a location on the server 605 at which it can access the voice note. Alternatively, the server 605 may send the voice note to the target UE 510 in a message. The server 605 may also send the message and/or voice note to the originator UE 505.

As will be appreciated from a review of the above-described embodiments, since the voice note generation can be directed by the originator subscriber whose voice is recorded at one or more target devices in a communication session, the legal issues that may need to be considered when the target device records the originator's voice do not apply. For example, wiretapping laws typically forbid recording of a speaker's voice without the speaker's consent, and if the speaker him/herself directs the other device to perform the recording function, then the consent is obtained. Further, in some embodiments, the originator and target subscribers can seamlessly continue a call without having to switch applications or press a single button (e.g., via voice commands) in order to record a note, allowing embodiments of the invention to be used even with a hands free device.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for seamlessly taking in-call voice notes. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for generating an in-call voice note comprising:
    conducting a call with an originator wireless subscriber device, wherein the call comprises a stream of data packets;
    receiving, from the originator wireless subscriber device, a first instruction to start recording a portion of the call based on a context of the call determined by content analysis of the call by a processor of the originator wireless subscriber device, wherein receiving the first instruction comprises receiving a first marker in a first header of a first one of the data packets, the first marker indicating where in the stream of data packets to start recording the portion of the call, wherein the first marker further comprises a recording marker in each of the data packets that are to be recorded;
    recording, in a content type that is determined by a stored preference, a portion of the call corresponding to the data packets containing the recording marker in response to receiving the first instruction, wherein the content type is one or more of audio, video, and text, and wherein the stored preference designates which content types should be recorded if more than one content type is available in the stream of data packets; and
    receiving, from the originator wireless subscriber device, a second instruction to stop recording the portion of the call, wherein receiving the second instruction to stop recording comprises receiving data packets that do not include the recording marker.

2. The method of claim 1, further comprising:
    sending an acknowledgment to the originator wireless subscriber device that the portion of the call is being recorded.

3. The method of claim 1, further comprising:
    storing the recorded portion of the call.

4. The method of claim 1, further comprising:
    displaying a notification that the portion of the call was recorded.

5. The method of claim 1, further comprising:
    converting the recorded portion of the call to text; and
    storing the converted text as a discrete file.

6. The method of claim 1, further comprising:
    processing the recorded portion of the call to determine whether the recorded portion of the call contains at least one construct; and
    processing the at least one construct.

7. The method of claim 6, wherein the at least one construct is an Internet address and processing the at least one construct comprises opening an Internet browser application to access the Internet address.

8. The method of claim 6, wherein the at least one construct is contact information and processing the at least one construct comprises storing the contact information in a contact list on a target device that performs the conducting and receiving steps.

9. The method of claim 6, wherein the at least one construct is an address and processing the at least one construct comprises opening a navigational application and entering the address into the navigational application.

10. The method of claim 1, wherein the method is performed by a server brokering the call between the originator wireless subscriber device and a target wireless subscriber device.

11. The method of claim 10, further comprising:
    forwarding the first instruction to start recording the portion of the call to the target wireless subscriber device.

12. The method of claim 10, further comprising:
    receiving an indication from the target wireless subscriber device that it is capable of recording the portion of the call, wherein in response to receiving the indication, the server does not record the portion of the call.

13. The method of claim 10, further comprising:
    receiving an indication from the target wireless subscriber device that it is not capable of recording the portion of the call.

14. The method of claim 13, further comprising:
    notifying the originator wireless subscriber device, by the server, that the portion of the call is being recorded.

15. The method of claim 1, wherein the method is performed by a target wireless subscriber device communicating with the originator wireless subscriber device.

16. The method of claim 15, further comprising:
    determining that the target wireless subscriber device cannot record the portion of the call; and
    in response to the determining, sending a negative acknowledgment to a server brokering the call between the originator wireless subscriber device and a target wireless subscriber device.

17. The method of claim 1, wherein the first instruction to start recording a portion of the call is received during an on-going call with the originator wireless subscriber device.

18. The method of claim 17, further comprising receiving, from the originator wireless subscriber device during the call, multiple first instructions to start recording a portion of the call and multiple second instructions to stop recording a portion of the call such that a plurality of voice notes corresponding to different portions of the call are recorded during the call.

19. An apparatus for generating an in-call voice note comprising:
a processor configured with software instructions to perform operations comprising:
conducting a call with an originator wireless subscriber device, wherein the call comprises a stream of data packets;
receiving, from the originator wireless subscriber device, a first instruction to start recording a portion of the call based on a context of the call determined by content analysis of the call by a processor of the originator wireless subscriber device, wherein receiving the first instruction comprises receiving a first marker in a first header of a first one of the data packets, the first marker indicating where in the stream of data packets to start recording the portion of the call, wherein the first marker further comprises a recording marker in each of the data packets that are to be recorded;
recording, in a content type that is determined by a stored preference, a portion of the call corresponding to the data packets containing the recording marker in response to receiving the first instruction, wherein the content type is one or more of audio, video, and text, and wherein the stored preference designates which content types should be recorded if more than one content type is available in the stream of data packets; and
receiving, from the originator wireless subscriber device, a second instruction to stop recording the portion of the call, wherein receiving the second instruction to stop recording comprises receiving data packets that do not include the recording marker.

20. The apparatus of claim 19, wherein the processor is configured with software instructions to perform operations further comprising:
sending an acknowledgement to the originator wireless subscriber device that the portion of the call is being recorded.

21. The apparatus of claim 19, wherein the processor is configured with software instructions to perform operations further comprising:
storing the recorded portion of the call.

22. The apparatus of claim 19, wherein the processor is configured with software instructions to perform operations further comprising:
displaying a notification that the portion of the call was recorded.

23. The apparatus of claim 19, wherein the processor is configured with software instructions to perform operations further comprising:
converting the recorded portion of the call to text; and
storing the converted text as a discrete file.

24. The apparatus of claim 19, wherein the processor is configured with software instructions to perform operations further comprising:
processing the recorded portion of the call to determine whether the recorded portion of the call contains at least one construct; and
processing the at least one construct.

25. The apparatus of claim 24, wherein the at least one construct is an Internet address and wherein the processor is configured with software instructions to perform operations such that processing the at least one construct comprises opening an Internet browser application to access the Internet address.

26. The apparatus of claim 24, wherein the at least one construct is contact information and wherein the processor is configured with software instructions to perform operations such that processing the at least one construct comprises storing the contact information in a contact list on a target device that performs the conducting and receiving operations.

27. The apparatus of claim 24, wherein the at least one construct is an address and wherein the processor is configured with software instructions to perform operations such that processing the at least one construct comprises;
opening a navigational application; and
entering the address into the navigational application.

28. The apparatus of claim 19, wherein the apparatus is a server brokering the call between the originator wireless subscriber device and a target wireless subscriber device.

29. The apparatus of claim 28, wherein the processor is configured with software instructions to perform operations further comprising:
forwarding the first instruction to start recording the portion of the call to the target wireless subscriber device.

30. The apparatus of claim 28, wherein the processor is configured with software instructions to perform operations further comprising:
receiving an indication from the target wireless subscriber device that it is capable of recording the portion of the call, wherein in response to receiving the indication, the server does not record the portion of the call.

31. The apparatus of claim 28, wherein the processor is configured with software instructions to perform operations further comprising:
receiving an indication from the target wireless subscriber device that it is not capable of recording the portion of the call.

32. The apparatus of claim 31, wherein the processor is configured with software instructions to perform operations further comprising:
notifying the originator wireless subscriber device, by the server, that the portion of the call is being recorded.

33. The apparatus of claim 19, wherein the apparatus is a target wireless subscriber device communicating with the originator wireless subscriber device.

34. The apparatus of claim 33, wherein the processor is configured with software instructions to perform operations further comprising:
determining that the target wireless subscriber device cannot record the portion of the call; and
sending, in response to the determining, a negative acknowledgment to a server brokering the call between the originator wireless subscriber device and a target wireless subscriber device.

35. The apparatus of claim 19, wherein the processor is configured with software instructions to perform operations such that the first instruction to start recording a portion of the call is received during an on-going call with the originator wireless subscriber device.

36. The apparatus of claim 35, wherein the processor is configured with software instructions to perform operations further comprising:
receiving, from the originator wireless subscriber device during the call, multiple first instructions to start recording a portion of the call and multiple second instructions to stop recording a portion of the call such that a plurality of voice notes corresponding to different portions of the call are recorded during the call.

37. An apparatus for generating an in-call voice note comprising:
- means for conducting a call with an originator wireless subscriber device, wherein the call comprises a stream of data packets;
- means for receiving, from the originator wireless subscriber device, a first instruction to start recording a portion of the call based on a context of the call determined by content analysis of the call by a processor of the originator wireless subscriber device, wherein means for receiving the first instruction comprises means for receiving a first marker in a first header of a first one of the data packets, the first marker indicating where in the stream of data packets to start recording the portion of the call, wherein the first marker further comprises a recording marker in each of the data packets that are to be recorded;
- means for recording, in a content type that is determined by a stored preference, a portion of the call corresponding to the data packets containing the recording marker in response to receiving the first instruction, wherein the content type is one or more of audio, video, and text, and wherein the stored preference designates which content types should be recorded if more than one content type is available in the stream of data packets; and
- means for receiving, from the originator wireless subscriber device, a second instruction to stop recording the portion of the call, wherein means for receiving the second instruction to stop recording comprises means for receiving data packets that do not include the recording marker.

38. A non-transitory computer-readable storage medium having stored thereon machine-executable instructions configured to cause a processor to perform operations for generating an in-call voice note, the operations comprising:
- conducting a call with an originator wireless subscriber device, wherein the call comprises a stream of data packets;
- receiving, from the originator wireless subscriber device, a first instruction to start recording a portion of the call based on a context of the call determined by content analysis of the call by a processor of the originator wireless subscriber device, wherein receiving the first instruction comprises receiving a first marker in a first header of a first one of the data packets, the first marker indicating where in the stream of data packets to start recording the portion of the call, wherein the first marker further comprises a recording marker in each of the data packets that are to be recorded;
- recording, in a content type that is determined by a stored preference, a portion of the call corresponding to the data packets containing the recording marker in response to receiving the first instruction, wherein the content type is one or more of audio, video, and text, and wherein the stored preference designates which content types should be recorded if more than one content type is available in the stream of data packets; and
- receiving, from the originator wireless subscriber device, a second instruction to stop recording the portion of the call, wherein receiving the second instruction comprises receiving data packets that do not include the recording marker.

\* \* \* \* \*